(12) United States Patent
Shimoda et al.

(10) Patent No.: US 7,364,606 B2
(45) Date of Patent: Apr. 29, 2008

(54) EXHAUST EMISSION CONTROL DEVICE

(75) Inventors: Masatoshi Shimoda, Hino (JP); Koichi Machida, Hino (JP); Takatoshi Furukawa, Hino (JP)

(73) Assignee: Hino Motors, Ltd., Hino-shi (JP)

( * ) Notice: Subject to any disclaimer, the term of this patent is extended or adjusted under 35 U.S.C. 154(b) by 232 days.

(21) Appl. No.: 10/558,562

(22) PCT Filed: Jun. 2, 2004

(86) PCT No.: PCT/JP2004/007611

§ 371 (c)(1),
(2), (4) Date: Nov. 29, 2005

(87) PCT Pub. No.: WO2004/109070

PCT Pub. Date: Dec. 16, 2004

(65) Prior Publication Data

US 2006/0249024 A1 Nov. 9, 2006

(30) Foreign Application Priority Data

| Jun. 3, 2003 | (JP) | ............................. 2003-157677 |
| Jun. 3, 2003 | (JP) | ............................. 2003-157678 |
| Jun. 5, 2003 | (JP) | ............................. 2003-160560 |

(51) Int. Cl.
*B03C 3/68* (2006.01)

(52) U.S. Cl. ........................... 96/18; 95/6; 95/7; 95/81; 96/23; 96/24; 96/54; 96/80; 96/82; 323/903

(58) Field of Classification Search ................ 96/18, 96/20, 22–24, 26, 30, 31, 54, 80–82; 95/5–7, 95/81; 323/903

See application file for complete search history.

(56) References Cited

U.S. PATENT DOCUMENTS

| 3,577,708 | A | * | 5/1971 | Drenning et al. ................. 95/5 |
| 3,984,215 | A | * | 10/1976 | Zucker ........................... 95/81 |
| 4,390,830 | A | * | 6/1983 | Laugesen ..................... 323/237 |
| 4,562,522 | A | * | 12/1985 | Adams et al. ................... 96/23 |
| 4,592,763 | A | * | 6/1986 | Dietz et al. .................... 95/26 |
| 5,378,978 | A | * | 1/1995 | Gallo et al. .................. 323/241 |
| 5,515,262 | A | * | 5/1996 | Johnston et al. .............. 363/90 |
| 5,597,403 | A | * | 1/1997 | Hankins ......................... 96/23 |

(Continued)

FOREIGN PATENT DOCUMENTS

EP        417771 A1 *  3/1991   .................... 96/80

(Continued)

*Primary Examiner*—Richard L. Chiesa
(74) *Attorney, Agent, or Firm*—Oblon, Spivak, McClelland, Maier & Neustadt, P.C.

(57) ABSTRACT

Provided are a hollow inner electrode constituted by an electrically conductive filter capable of capturing particulates, a cylindrical outer electrode circumferentially surrounding the electrode, a housing incorporated in a flow passage of exhaust and accommodating the electrodes and, a temperature sensor for detecting temperature of the exhaust and an electric discharge controller for controlling electric power to be distributed to the electrodes and on the basis of a detected value of the temperature sensor. When the temperature of the exhaust obtained by the temperature sensor is lowered, electric power necessary for generation of discharge plasma is distributed by the discharge controller to the electrodes and, thereby oxidizing the particulates captured by the electrode to reduce electricity consumption.

1 Claim, 10 Drawing Sheets

U.S. PATENT DOCUMENTS

| | | | |
|---|---|---|---|
| 5,942,026 A * | 8/1999 | Erlichman et al. | 96/58 |
| 6,063,168 A * | 5/2000 | Nichols et al. | 96/80 |
| 6,611,440 B1 * | 8/2003 | Johnston et al. | 363/44 |
| 6,839,251 B2 * | 1/2005 | Johnston et al. | 363/44 |
| 7,122,070 B1 * | 10/2006 | Krichtafovitch | 95/2 |
| 2006/0249024 A1 * | 11/2006 | Shimoda et al. | 96/19 |

FOREIGN PATENT DOCUMENTS

| | | | |
|---|---|---|---|
| JP | 7-310525 | | 11/1995 |
| JP | 8-135431 | | 5/1996 |
| JP | 2001-511493 A | * | 8/2001 |
| JP | 2002-501813 | | 1/2002 |
| JP | 2002-256853 | | 9/2002 |
| JP | 2003-520316 A | * | 7/2003 |
| WO | 99/05400 | | 2/1999 |
| WO | WO 99/38603 A1 | * | 8/1999 |
| WO | 00/43645 | | 7/2000 |

* cited by examiner

EXHAUST EMISSION CONTROL DEVICE

CROSS-REFERENCE TO RELATED APPLICATIONS

The present application is a national stage entry of International Application No. PCT/JPO4/07611, filed on Jun. 2, 2004. The present application also claims priority under 35 U.S.C. §119 to Japanese Patent Application No. 2003-15767, filed Jun. 3, 2003, to Japanese Patent Application No. 2003-157678, filed Jun. 3, 2003, and to Japanese Patent Application No. 2003-160560, filed Jun. 5, 2003.

TECHNICAL FIELD

The present invention relates to an exhaust emission control device.

BACKGROUND ART

Particulates or particulate matter entrained in exhaust (burned gas of diesel oil) from a diesel engine is mainly constituted by carbonic soot and a soluble organic fraction (SOF) of high-boiling hydrocarbon and contains a trace of sulfate (misty sulfuric acid fraction).

In order to suppress the particulates from being diffused into atmosphere, conventionally a filter for capturing particulates is incorporated into an engine exhaust system.

An example of the particulate filter comprises a honeycomb core made of ceramics such as cordierite and having a number of passages compartmentalized by porous thin walls, exhaust from an engine flowing through the passages.

In the above-mentioned particulate filter, alternate ones of the parallel passages have plugged one ends so as to guide the exhaust to unplugged one ends of the gas passages adjacent thereto; the passages through which the exhaust flows have the plugged other ends so as to connect unplugged other ends of the gas passages adjacent thereto to a muffler.

Thus, the particulates entrained in the exhaust are captured by the porous thin walls and only the exhaust passing through the walls is discharged to the atmosphere.

The particulates attached to the thin walls will spontaneously ignite to be oxidized when an engine operating status is shifted to a region with increased exhaust temperature.

However, for example, in a shuttle-bus running mainly on city roads with generally lower running speeds, there is few chance to continue an engine operational status capable of obtaining exhaust temperature suited for oxidation treatment of the particulates. As a result, a captured particulate amount will exceed an oxidized amount, leading to clogging of the porous thin walls.

Thus, recently, a plasma assisted exhaust emission control device (gas treatment reaction vessel) has been proposed which can oxidize particulates even if exhaust temperature is low (see, for example, Reference 1).

In this exhaust emission control device, inner and outer electrodes each in the form of drilled stainless cylinders are coaxially arranged in a chamber. A gap between the electrodes is charged with dielectrics in the form of pellets so as to allow the exhaust to pass. The exhaust from the engine is guided to a gap between the chamber and the outer electrode.

Thus, the particulates entrained in the exhaust supplied from between the chamber and the outer electrode to the pellet charged layer are attached to the pellets and only the exhaust passing through the layer is discharged to the atmosphere.

Higher voltage is applied across the electrodes to generate discharge plasma and excite the exhaust, so that unburned hydrocarbon, oxygen and nitrogen monoxide are activated into oxygen-containing hydrocarbon, ozone and nitrogen dioxide, respectively.

Thus, even with lower exhaust temperature, the particulates attached to the pellets will spontaneously ignite to be oxidized.

[Reference 1] JP 2002-501813A

SUMMARY OF THE INVENTION

Problems to be Solved by the Invention

However, constant application of higher voltage to the electrodes in the conventional plasma assisted exhaust emission control device will result in excessively consumed electricity.

When the electric power for generation of electric discharge is alternating current (AC), an equivalent circuit is a circuit in which AC high voltage is applied to a condenser constituted by inner and outer electrodes. Capacitance of the condenser may vary depending upon for example the captured particulate amount and/or the exhaust components; thus, it is assumed that reactance of the circuit varies to cause phase lag between voltage and current waveforms, resulting in lowering of power factor.

Furthermore, it has not been practiced to actually decide how much particles are captured in the conventional plasma assisted exhaust emission control device.

The invention was made in view of the above and has its object to provide an exhaust emission control device with less electricity consumption which can avert lowering of power factor due to the captured particulate amount and/or the exhaust components and which can decide an amount of particulates captured.

Means or Measure for Solving the Problems

In order to attain the above object and according to a first aspect of the invention, provided are electrodes for generating plasma in exhaust through electric discharge, a capturing body for capturing particulates entrained in the exhaust, a temperature sensor for detecting temperature of the exhaust and an electric discharge controller for controlling electric power to be distributed to the electrodes on the basis of a detected value of said temperature sensor.

According to a second aspect of the invention, provided are electrodes for generating plasma in exhaust through electric discharge, a capturing body for capturing particulates entrained in the exhaust, captured amount deciding means for deciding amount of the particulates captured by said capturing body and an electric discharge controller for controlling electric power to be distributed to the electrodes on the basis of a calculated value of said captured amount deciding means.

According to a third aspect of the invention, provided are a capturing cell for capturing particulates between a pair of electrodes arranged in a flow passage of exhaust, high voltage output means for distributing AC power for electric discharge to the electrodes, a plurality of inductors parallelly connectable between said high voltage output means and said electrodes and inductance control means for detecting a phase of the AC power distributed to the electrodes and for connecting proper one or ones of the inductor to the high voltage output means and to the electrodes so as to reduce reactance variation.

According to a fourth aspect of the invention, provided are a capturing cell for capturing particulates between a pair of electrodes arranged in a flow passage of exhaust, high voltage output means for distributing AC power for electric discharge to the electrodes, a variable inductor arranged between said high voltage output means and said electrodes and inductance control means for detecting a phase of the AC power distributed to the electrodes and for controlling the variable inductor so as to reduce reactance variation.

According to a fifth aspect of the invention, provided are a capturing cell for capturing particulates between a pair of electrodes arranged in a flow passage of exhaust, high voltage output means for distributing AC power for electric discharge to the electrodes, a plurality of variable inductors parallelly connectable between said high voltage output means and said electrodes and inductance control means for detecting a phase of the AC power distributed to the electrodes and for controlling variable inductance through connection of proper one or ones of the variable inductors to the high voltage output means and to the electrodes so as to reduce reactance variation.

According to a sixth aspect of the invention, provided are one and the other electrodes, said one electrode being constituted by an electrically conductive filter capable of capturing particulates and arranged in a flow passage of exhaust, the other electrode being arranged adjacent to said one electrode, an electric discharge controller for distributing electric power for generation of electric discharge to the electrodes and captured amount deciding means for detecting resistance value upon power distribution to said one electrode to decide a particulate amount.

According to a seventh aspect of the invention, provided are one and the other electrodes, said one electrode being constituted by an electrically conductive filter capable of capturing particulate and arranged in a flow passage of the exhaust, the other electrode being arranged adjacent to said one electrode, an electric discharge controller for distributing electric power for generation of electric discharge to the electrodes and captured amount deciding means for detecting current value upon power distribution to said one electrode to decide a particulate amount.

According to an eighth aspect of the invention, provided are one and the other electrodes, said one electrode being constituted by an electrically conductive filter capable of capturing particulates and arranged in a flow passage of exhaust, the other electrode arranged adjacent to said one electrode, an electric discharge controller for distributing electric power for generation of electric discharge to the electrodes and captured amount deciding means for detecting voltage value upon power distribution to said one electrode to decide a particulate amount.

In the first aspect of the invention, when the exhaust temperature detected by the temperature sensor is lower than a setting value, electric power necessary for generation of discharge plasma is distributed by the discharge controller to the electrodes, thereby oxidizing the particulates captured by the capturing body.

In the second aspect of the invention, when the particulate amount estimated by the captured amount deciding means exceeds a setting value, electric power necessary for generation of discharge plasma is distributed by the discharge controller to the electrodes, thereby oxidizing the particulates captured by the capturing body.

In the third aspect of the invention, the inductance control means for detecting the phase of AC power distributed to the electrodes in the capturing cell connects proper one or ones of the inductances to the high voltage output means and to the electrode so as to reduce reactance variation.

In the fourth aspect of the invention, the inductance control means for detecting the phase of AC power distributed to the electrodes in the capturing cell controls the variable inductance so as to reduce reactance variation.

In the fifth aspect of the invention, the inductance control means for detecting the phase of AC power distributed to the electrodes in the capturing cell connects proper one or ones of the variable inductances to the high voltage output means and to the electrodes and controls said variable inductances so as to reduce reactance variation.

In the sixth aspect of the invention, when the particulates captured by the one electrodes constituted by the electrically conductive filter are increased, resistant value upon power distribution to the one electrode is decreased accordingly.

In the seventh aspect of the invention, when the particulates captured by the one electrode constituted by the electrically conductive filter are increased, current value upon power distribution to the one electrode is increased accordingly.

In the eighth aspect of the invention, when the particulates captured by the one electrode constituted by the electrically conductive filter are increased, voltage value upon power distribution to the one electrode is decreased accordingly.

EFFECTS OF THE INVENTION

According to an exhaust emission control device of the invention, the following various excellent meritorious effects may be obtained.

(1) In the first aspect of the invention, when the exhaust temperature detected by the temperature sensor is lower than the setting value, electric power necessary for generation of discharge plasma is distributed by the discharge controller to the electrodes to thereby oxidize the particulates captured by the capturing body, so that electric power consumption is reduced to enhance energy use efficiency.

(2) In the second aspect of the invention, when the captured particulate amount estimated by the captured particulate amount deciding means exceeds the setting value, electric power necessary for generation of discharge plasma is distributed by the discharge controller to the electrodes to thereby oxidize the particulates captured by the capturing body, so that electric power consumption is reduced to enhance energy use efficiency.

(3) In the third aspect of the invention, on the basis of the phase of the AC power, the inductance control means connects proper one or ones of the inductors to the high voltage output means and to the electrodes to thereby reduce reactance variation, so that lowering of power factor due to the captured particulate amount and/or the exhaust components can be averted to enhance energy efficiency.

(4) In the fourth aspect of the invention, on the basis of the phase of the AC power, the inductance control means controls the variable inductor to thereby reduce reactance variation, so that lowering of power factor due to the captured particulate amount and/or the exhaust components can be averted to enhance energy efficiency.

(5) In the fifth aspect of the invention, on the basis of the phase of the AC power, the inductance control means connects proper one or ones of the variable inductors to the high voltage output means and to the electrodes and controls said variable inductors to thereby reduce reactance variation, so that lowering of power factor due to the captured particulate amount and/or the exhaust components can be averted to enhance energy efficiency.

(6) In the sixth aspect of the invention, when the particulates captured by the one electrode constituted by the electrically conductive filter are increased, resistance value upon power distribution to the one electrode is decreased accordingly, so that decided is the captured particulate amount to thereby efficiently distribute electric power for electric discharge to the electrodes.

(7) In the seventh aspect of the invention, when the particulates captured by the one electrode constituted by the electrically conductive filter are increased, current value upon power distribution to the one electrode is increased accordingly, so that decided is the captured particulate amount to thereby-efficiently distribute electric power for electric discharge to the electrodes.

(8) In the eighth aspect of the invention, when the particulates captured by the one electrode constituted by the electrically conductive filter are increased, voltage value upon power distribution to the one electrode is decreased accordingly, so that decided is the captured particulate amount to thereby efficiently distribute electric power for electric discharge to the electrodes.

BEST MODE FOR CARRYING OUT THE INVENTION

Embodiments of the invention will be described with reference to the drawings.

Embodiment 1

FIGS. 1 and 2 show a first embodiment of an exhaust emission control device according to the invention. This exhaust emission control device comprises a capturing cell 1, a temperature sensor 2 and an electric discharge controller 3.

The cell 1 comprises a housing 4 incorporated in a flow passage of exhaust G to be purified, a hollow inner electrode 5 constituted by an electrically conductive filter capable of capturing particulates and coaxially arranged within the housing 4, a cylindrical outer electrode 6 arranged within the housing 4 to circumferentially surround the electrode 5 and a dielectric 7 made of ceramics for lining of an inner surface of the outer electrode 6.

Moreover, a particulate filter using for example cordierite is incorporated in the flow passage of the exhaust G separately from the capturing cell 1.

The above-mentioned electrically conductive filter may be, for example, fibrous metal laminated and sintered into integrity, sintered body of metallic powder, fine metallic mesh laminated and sintered into integrity or metallic powder carried by fine metallic mesh through sintering; any of them may capture the particles while ensuring passing of the gas.

The inner electrode 5 has closed upstream and open downstream ends in a direction of travel of the exhaust G. An annular insulant 8 is arranged downstream of the electrodes 5 and 6 in the direction of travel of the exhaust G so as to contact whole circumferences of the ends of the electrodes 5 and 6.

Thus, the exhaust G from an engine (not shown) flows into a gap 9 between an outer surface of the inner electrode 5 and an inner surface of the dielectric 7 in the capturing cell 1, passes through the electrode 5 from outward to inward thereof and flows via the inner space in the electrode 5 into a muffler (not shown) downstream of the cell 1, the particulates being captured by the electrode 5 which is the electrically conductive filter.

The sensor 2 is arranged at an exhaust inflow port of the housing 4 to detect a temperature of the exhaust G.

The discharge controller 3 is connected to the temperature sensor 2 and to an in-vehicle power supply 10 such as alternator.

The discharge controller 3 is constructed to conduct control (see FIG. 2) such that electric power to be distributed to the electrodes 5 and 6 is set to have a discharge plasma amount generated enough for oxidation of particulates when a value (temperature of the exhaust G) detected by the sensor 2 is in a range not reaching spontaneous ignition of the particulates and that electric power to be delivered to the electrodes 5 and 6 is reduced to suppress the discharge plasma amount generated when the value detected by the sensor 2 is in a range reaching the oxidation of the particulates.

The above-mentioned control of electric power to be distributed depends on temperature of the exhaust G and may be, for example, in the form of a. increase/decrease of time for power distribution to the electrodes 5 and 6 per unit time,
b. increase/decrease of voltage applied to the electrodes 5 and 6,
c. increase/decrease of current applied to the electrodes 5 and 6,
d. distribution of AC to the electrodes 5 and 6 and increase/decrease of frequency thereof,
e. distribution of DC to the electrodes 5 and 6 and increase/decrease of duty ratio thereof or
f. increase/decrease of waveform risetime in item e above.

Thus, when the temperature of the exhaust G is low, for example ozone and/or oxygen radical is generated by the discharge controller 3 through discharge plasma to oxidize the particulates to thereby reduce electric power consumption.

Embodiment 2

FIGS. 3 to 5 show a second embodiment of an exhaust emission control device according to the invention. This exhaust emission control device comprises a capturing cell 1, captured amount deciding means 11 and an electric discharge controller 12; the capturing cell 1 and an in-vehicle power supply 10 are structurally of the same as those in FIG. 1.

The deciding means 11 is constructed such that it measures parameters such as an inner pressure in the housing 4 and electric characteristics of the inner electrode 5 (voltage, current and resistance values upon power distribution) and calculates a captured particulate amount on the electrode 5 at the time on the basis of interrelation between measured parameter values and a preliminarily measured, captured particulate amount on the electrode 5.

The discharge controller 12 is connected to the in-vehicle power supply 10 and to the captured amount deciding means 11.

The discharge controller 12 is constructed to conduct control (see FIGS. 4 and 5) such that electric power to be distributed to the electrodes 5 and 6 is increased to increase a discharge plasma amount generated depending upon the captured particulate amount when the captured particulate amount calculated by the deciding means 11 exceeds a preset range.

The above-mentioned control of electric power to be distributed depends on captured particulate amount and may be, for example, in the form of g. increase/decrease of time for power distribution to the electrodes 5 and 6 per unit time, h. increase/decrease of voltage applied to the electrodes 5 and 6, i. increase/decrease of current applied to the electrodes 5 and 6, j. distribution of AC to the electrodes 5 and 6 and increase/decrease of frequency thereof, k. distribution of DC to the electrodes 5 and 6 and increase/decrease of duty ratio thereof or l. increase/decrease of waveform risetime in item k above.

Thus, only when the captured particulate amount on the electrode 5 is increased, for example ozone and/or oxygen radical is generated by the discharge controller 12 through discharge plasma to oxidize the particulates to thereby reduce electric power consumption.

The electrodes for generation of discharge plasma may be in the shape of parallel plates or lattice; pellets or honeycomb of ceramics may be utilized for the particulate capturing body.

Embodiment 3

FIG. 6 shows a third embodiment of an exhaust emission control device according to the invention. This exhaust emission control device comprises a capturing cell 21, high voltage output means 22 for outputting AC power for electric discharge, a plurality of inductors L1-L6 and inductance control means 23.

The capturing cell 21 comprises a pair of electrodes 24 and 25 arranged in a flow passage of the exhaust G to be purified and a dielectric 26 for lining of the one electrode 24, the other electrode 25 being constituted by an electrically conductive filter capable of capturing particulates.

The electrodes 24 and 25 may be of a shape such as cylinder, parallel plates or lattice.

The electrically conductive filter may be fibrous metal laminated and sintered into integrity, sintered body of metallic powder, fine metallic mesh laminated and sintered into integrity or metallic powder carried by fine metallic mesh through sintering; any of them may capture the particulates while ensuring passing of the gas. The particulates may be also attached to a surface of the dielectric 26.

The inductors L1-L6 are serially connected to switches S1-S6, respectively, these serial combinations of the inductors L1-L6 with the switches S1-S6, respectively, are parallelly connected to the high voltage output means 22 and to the electrode 25 in the capturing cell 21.

With at least one of the switches S1-S6 being closed, the inductance control means 23 detects phase lag between voltage and current waveforms of AC distributed by the high voltage output means 22 to the electrodes 24 and 25, calculates inductance necessary for reducing reactance variation at the time, and closes any or some of the switches S1-S6 accompanied with the inductors L1-L6, respectively, to be connected to the circuit so as to obtain inductance similar or equal to the calculated vale by singularly any of the inductors L1-L6 or by combination thereof.

More specifically, five alternative inductance values may be obtained in combination of opening and closing of the switches S1-S6 when the inductances of the inductors L1-L6 are all the same; maximum 35 inductance values may be obtained in combination of opening and closing of the switches S1-S6 when the inductances of the inductors L1-L6 are different.

Thus, the inductance control means 23 connects proper one or ones of the inductors L1-L6 to the high voltage output means 22 and to the electrodes 24 and 25 so as to reduce reactance variation, so that lowering of power factor due to the captured particulate amount and/or the exhaust components can be averted so as to enhance energy efficiency.

As a result, when the amount of the particulates captured in the capturing cell 21 becomes excessive, AC power is delivered by the high voltage output means 22 to the electrodes 24 and 25 to generate discharge plasma, whereby the particulates are reliably oxidized by, for example, ozone and/or oxygen radical.

Embodiment 4

FIG. 7 shows a fourth embodiment of an exhaust emission control device according to the invention. This exhaust emission control device comprises a capturing cell 21, high voltage output means 22, a variable inductor L7 and inductance control means 27, the capturing cell 21 and the high voltage output means 22 being structurally of the same as those in FIG. 6.

The inductance control means 27 is constructed such that it detects phase lag between voltage and current waveforms of AC delivered by the high voltage output means 22 to the electrodes 24 and 25, calculates inductance necessary for reducing reactance variation and controls the variable inductor L7 so as to obtain inductance similar or equal to the calculated value.

Thus, obtained is the inductance value in a range depending upon design condition of the variable inductor L7.

In this manner, the inductance control means 27 controls the variable inductor L7 so as to reduce reactance variation, so that lowering of power factor due to the captured particulate amount and/or the exhaust components to enhance energy efficiency.

Thus, when the amount of particulates captured in the capturing cell 21 becomes excessive, AC power is distributed by the high voltage output means 22 to the electrodes 24 and 25 to generate discharge plasma, whereby the particulates can be reliably oxidized through ozone and/or oxidized radical.

Embodiment 5

FIG. 8 shows a fifth embodiment of an exhaust emission control device according to the invention. This exhaust emission control device comprises a capturing cell 21, high voltage output means 22, variable inductors L8 and L9 and inductance control means 28; the capturing cell 21 and high voltage output means 22 being structurally of the same as those in FIG. 6.

The variable inductors L8 and L9 are serially connected to the switches S8 and S9, respectively; these serially interconnected variable inductors L8 and L9 and switches S8 and S9 are connected parallelly to the high voltage output means 22 and to the electrode 25 in the capturing cell 21.

The inductance control means 28 is constructed such that, with at least one of the switches S8 and S9 being closed, the means 28 detects phase lag between voltage and current waveforms of AC distributed by the high voltage output means 22 to the electrodes 24 and 25, calculates inductance necessary for reducing reactance variation at the time, closes either or both of the switches S8 and S9 accompanied with the variable inductors L8 and L9 to be connected to the circuit so as to obtain inductance similar or equal to the calculated value singularly by the variable inductor L8 or L9 or by combination thereof and controls the variable inductors L8 and L9.

Thus, inductance value will be obtained in a range depending upon either of the design conditions of the variable inductors L8 and L9 or combination thereof.

In this way, the inductance control means 28 controls the variable inductors L8 and L9 so as to reduce reactance variation, so that lowering of power factor due to the captured particulate amount and/or the exhaust components can be averted to enhance energy efficiency.

Thus, when the captured particulate amount in the capturing cell 21 becomes excessive, Ac power is delivered by the high voltage output means 22 to the electrodes 24 and 25 to generate discharge plasma, whereby the particulates can be reliably oxidized through ozone and/or oxygen radical.

Embodiment 6

FIGS. 9 and 10 show a sixth embodiment of an exhaust emission control device according to the invention. This exhaust emission control device comprises a capturing cell 31, captured amount deciding means 32 and an electric discharge controller 33.

The capturing cell 31 comprises a housing 34 incorporated in a flow passage of exhaust G to be purified, a hollow inner electrode 35 constituted by an electrically conductive filter capable of capturing particulates and coaxially arranged within the housing 34, a cylindrical outer electrode 36 arranged within the housing 34 to circumferentially surround the inner electrode 35 and a dielectric 37 made of for example ceramics for lining of an inner surface of the outer electrode 36.

Moreover, a particulate filter using for example cordierite is incorporated in the flow passage of the exhaust G separately from the capturing cell 31.

The electrically conductive filter may be fibrous metal laminated and sintered into integrity, sintered body of metallic powder, fine metallic mesh laminated and sintered into integrity or metallic powder carried by fine metallic mesh through sintering; any of them may capture the particulates while ensuring passing of the gas.

The inner electrode 35 has upstream closed and downstream open ends in a direction of travel of the exhaust G; an annular insulant 38 is arranged downstream of the electrodes 35 and 36 in the direction of travel of the exhaust G so as to contact whole circumference of the ends of the electrodes 35 and 36.

Thus, the exhaust G from an engine (not shown) flows into a gap 39 between an outer surface of the inner electrode 35 and an inner surface of the dielectric 37 in the capturing cell 31, pass the electrode 35 from outward to inward thereof and flows via an interior space in the electrode 35 to a muffler (not shown) downstream of the capturing cell 31; the particulates are captured by the electrode 35 which is the electrically conductive filter.

The deciding means 32 is constructed such that it measures resistance value of the electric circuit through power distribution of the inner electrode 35 by current for searching, and decides whether the captured particulate amount on the inner electrode 35 at the time exceeds a setting value or not so as to output a signal, on the basis of interrelation between said resistance value as parameter and a preliminarily measured captured amount of particulates on the electrode 35 and in accordance with steps S10-S15 in FIG. 10.

Alternatively, the measured resistance value may be compared with a plurality of setting values to assume a degree of the captured particulate amount on the inner electrode 35. When no power distribution of current for searching is conducted, the deciding means 32 is adapted to be disconnected from the above-mentioned electric circuit.

The main component of the particulates is carbon (dielectric). As a result, the more the particulate amount captured by the electrode 35 is, the lower the resistance value as determining factor for the captured amount is.

Thus, by measuring resistance value of the electrode 35 at a proper interval upon no electric discharge, decided is whether the inner electrode 35 has captured a setting amount of particulates or not.

The discharge controller 33 is connected to the above-mentioned deciding means 32 and to an in-vehicle power supply 40 such as alternator.

The discharge controller 33 is constructed such that, when it receives a decision signal on excessively captured particulate amount from the deciding means 32, it delivers electric power to the electrodes 35 and 36 to generate discharge plasma.

Thus, when the amount of the particulates captured by the inner electrode 35 becomes excessive, the discharge controller 33 generates discharge plasma to oxidize the particulates through, for example, ozone and/or oxygen radical.

Embodiment 7

FIGS. 11 and 12 show a seventh embodiment of an exhaust emission control device according to the invention. This exhaust emission control device comprises a capturing cell 31, captured amount deciding means 41 and a discharge controller 33, the capturing cell 31, the discharge controller 33 and the in-vehicle power supply 40 being structurally of the same as those in FIG. 9.

The deciding means 41 is constructed such that it measures current value of the electric circuit through power distribution of the electrode 35 by current for searching, and decides whether the captured particulate amount on the electrode 35 at the time exceeds a setting value or not to output a signal, on the basis of interrelation between said current value as parameter and a preliminarily measured captured amount of particulates on the inner electrode 35 and in accordance with steps S20-S25 in FIG. 12.

Alternatively, the measured current value may be compared with a plurality of setting values to assume a degree of the captured particulate amount on the inner electrode 35. When no power distribution of current for searching is conducted, the deciding means 41 is adapted to be disconnected from the above-mentioned electric circuit.

The main component of the particulates is carbon (dielectric). As a result, the more the amount of particulates captured by the electrode 35 is, the higher the current value as deciding factor for the captured amount is.

Thus, by measuring current value of the electrode 35 at proper interval upon no electric discharge, decided is whether the electrode 35 has captured a setting amount of particulates or not.

The discharge controller 33 is connected to the above-mentioned deciding means 41 and to the in-vehicle power supply 40.

Thus, when the amount of the particulates captured by the electrode 35 becomes excessive, the discharge controller 33 generates discharge plasma to oxidize the particulates through, for example, ozone and/or oxygen radical.

Embodiment 8

FIGS. 13 and 14 show an eighth embodiment of an exhaust emission control device according to the invention. This exhaust emission control device comprises a capturing cell 31, captured amount deciding means 42 and an electric discharge controller 33, the capturing cell 31, the discharge controller 33 and an in-vehicle power supply 40 being structurally of the same as those in FIG. 9.

The deciding means 42 is constructed such that it measures voltage value of the electric circuit through power distribution of the electrode 35 by current for searching and decides whether the captured particulate amount on the electrode 35 at the time exceeds a setting value or not so as to output a signal, on the basis of interrelation between said voltage value as parameter and a preliminarily measured captured amount of the particulates on the electrode 35 and in accordance with steps S30-S35 in FIG. 14.

Alternatively, the measured voltage value may be compared with a plurality of setting values to assume a degree of the captured particulate amount on the electrode 35. When no power distribution of current for searching is conducted, the deciding means 42 is adapted to be disconnected from the above-mentioned electric circuit.

The main component of the particulates is carbon (dielectric). As a result, the more the amount of particulates captured by the electrode 35 is, the more prominently the voltage value as deciding factor for the captured amount is lowered.

Thus, by measuring the voltage value of the electrode 35 at proper interval upon no electric discharge, decided is whether the electrode 35 has captured the setting amount of particulates or not.

The discharge controller 33 is connected to the above-mentioned deciding means 42 and to the in-vehicle power supply 40.

Thus, when the amount of the particulates captured by the inner-electrode 35 becomes excessive, the discharge controller 33 generates discharge plasma to oxidize the particulates through, for example, ozone and/or oxygen radical.

The electrodes for generation of discharge plasma may be in the shape of opposed plates or lattice.

It is to be understood that an exhaust emission control device according to the invention is not limited to the above-mentioned embodiments and that various changes and modifications may be effected without leaving the gist of the invention.

INDUSTRIAL APPLICABILITY

An exhaust emission control device according to the invention may be applicable to various types of vehicles.

Figure 1:
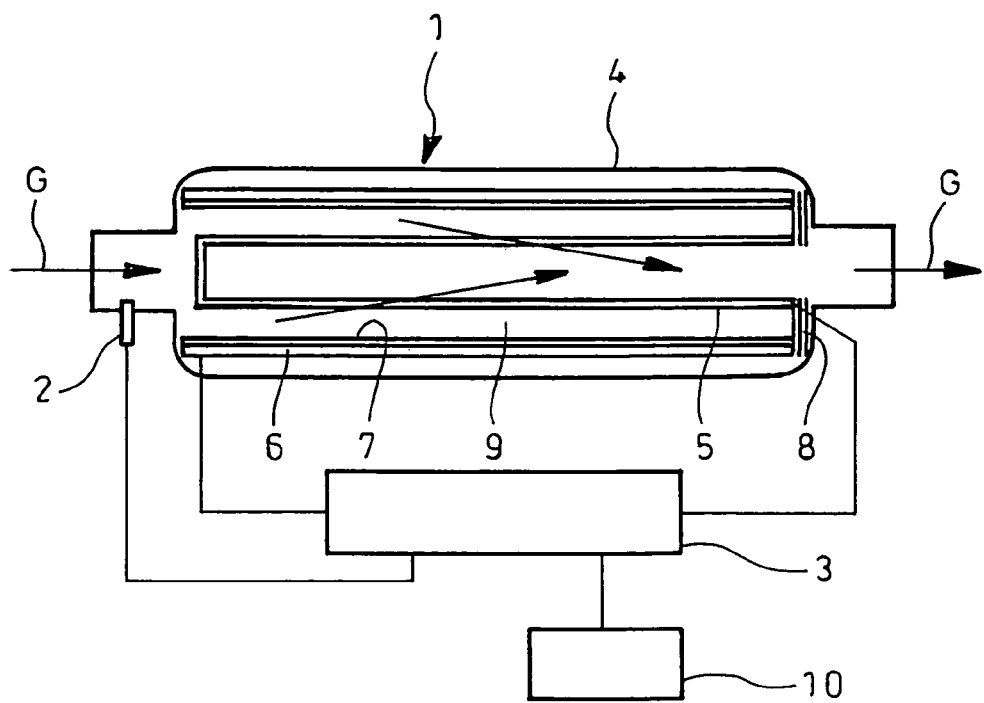
FIG. 1. A conceptual diagram showing a first embodiment of an exhaust emission control device according to the invention.
Figure 2:
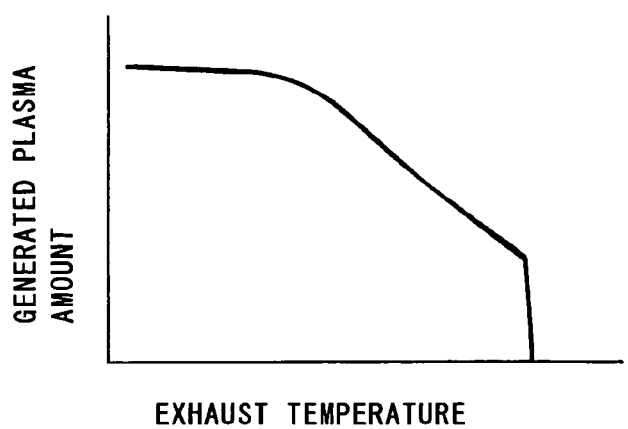
FIG. 2. A graph showing an example of relationship between exhaust temperature and generated plasma amount.
Figure 3:
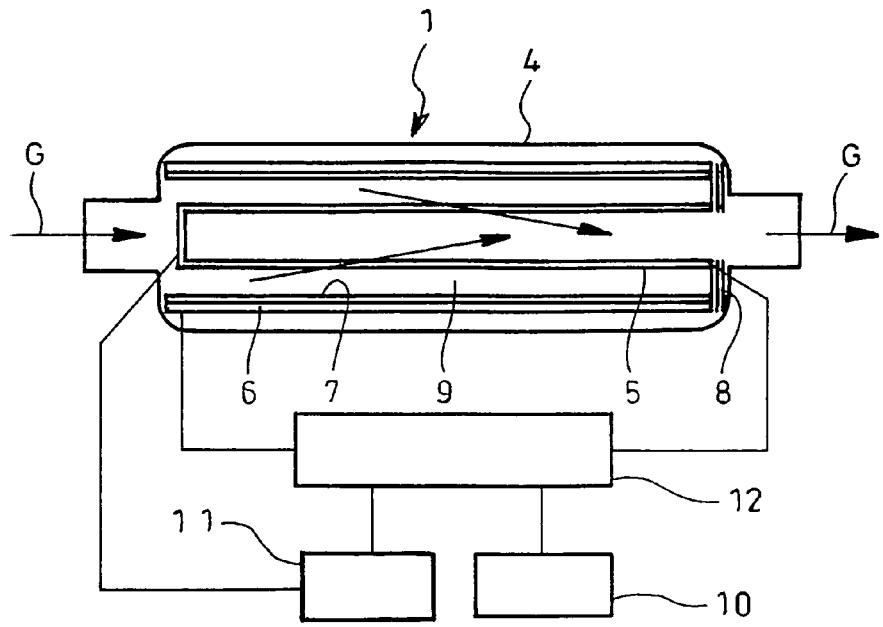
FIG. 3. A conceptual diagram showing a second embodiment of an exhaust emission control device according to the invention.
Figure 4:
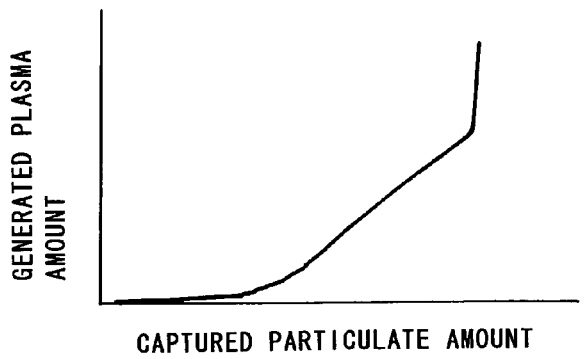
FIG. 4. A graph showing an example of relationship between captured particulate amount and generated plasma amount.
Figure 5:
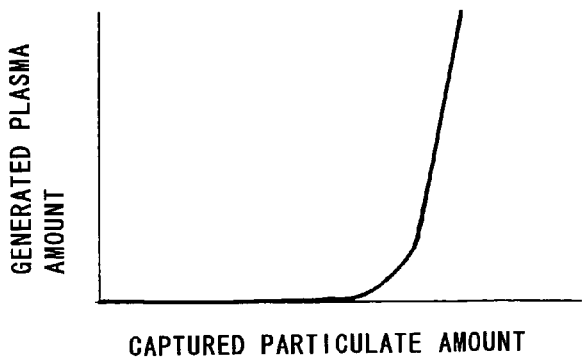
FIG. 5. A graph showing another example of relationship between captured particulate amount and generated plasma amount.
Figure 6:
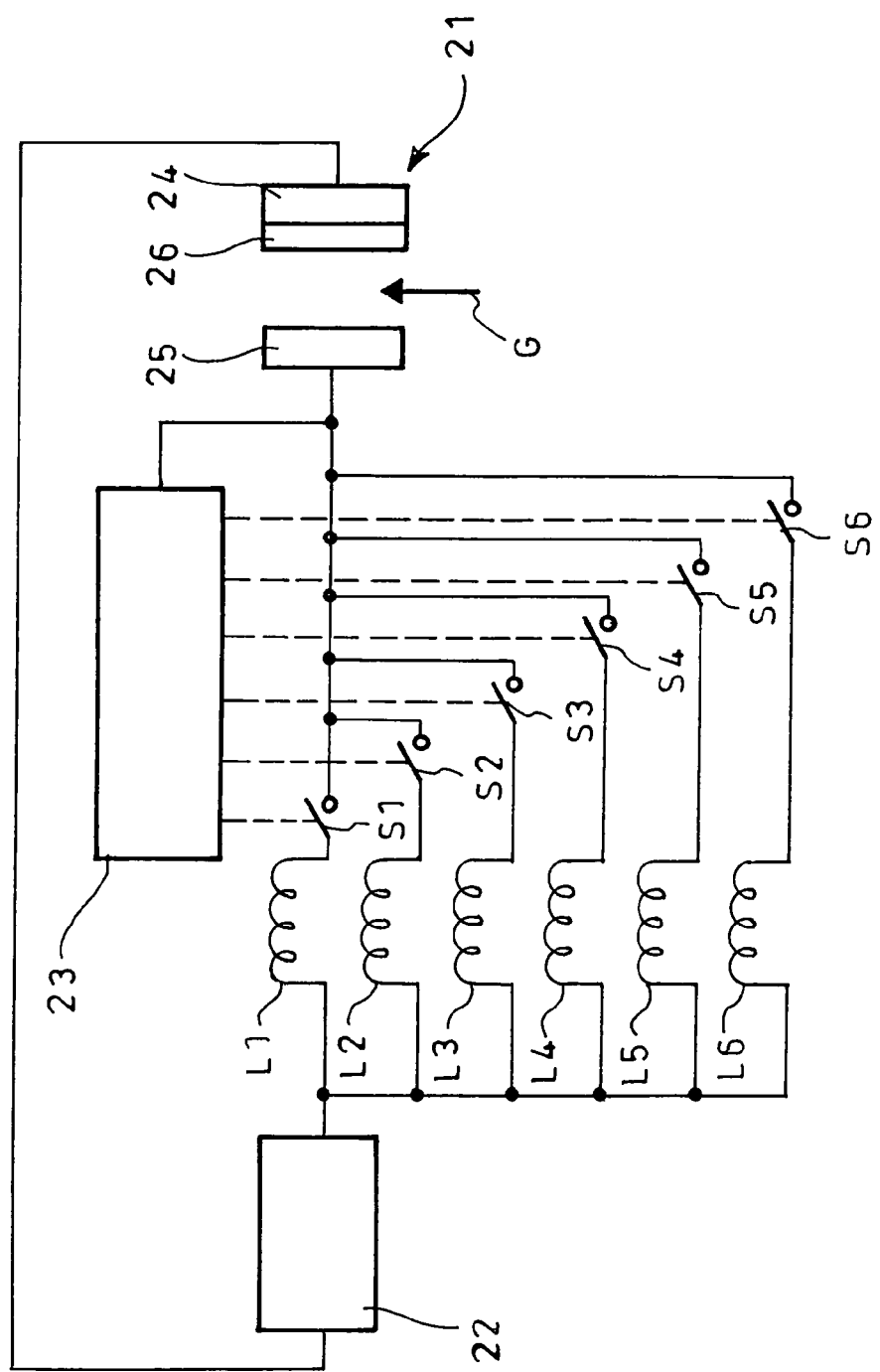
FIG. 6. A conceptual diagram showing a third embodiment of an exhaust emission control device according to the invention.
Figure 7:
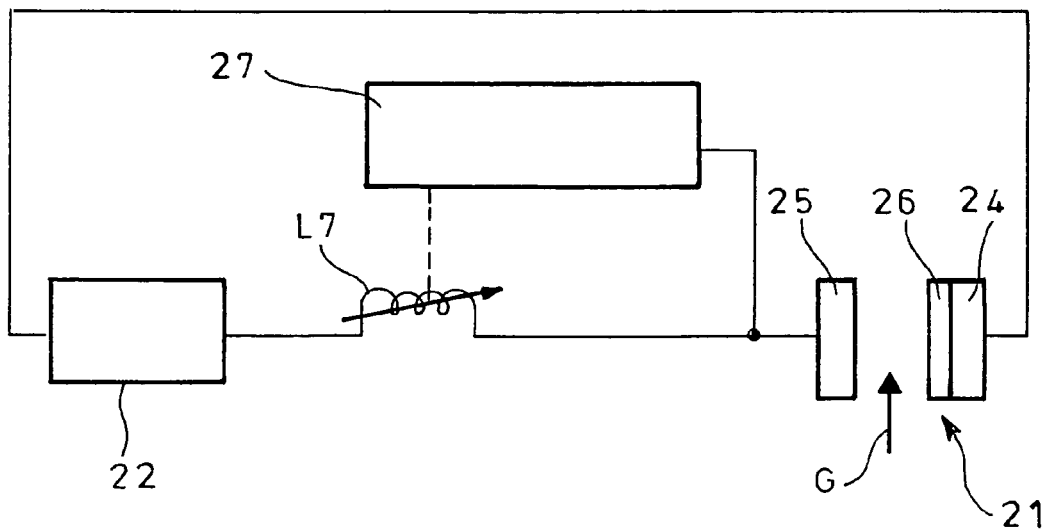
FIG. 7. A conceptual diagram showing a fourth embodiment of an exhaust emission control device according to the invention.
Figure 8:
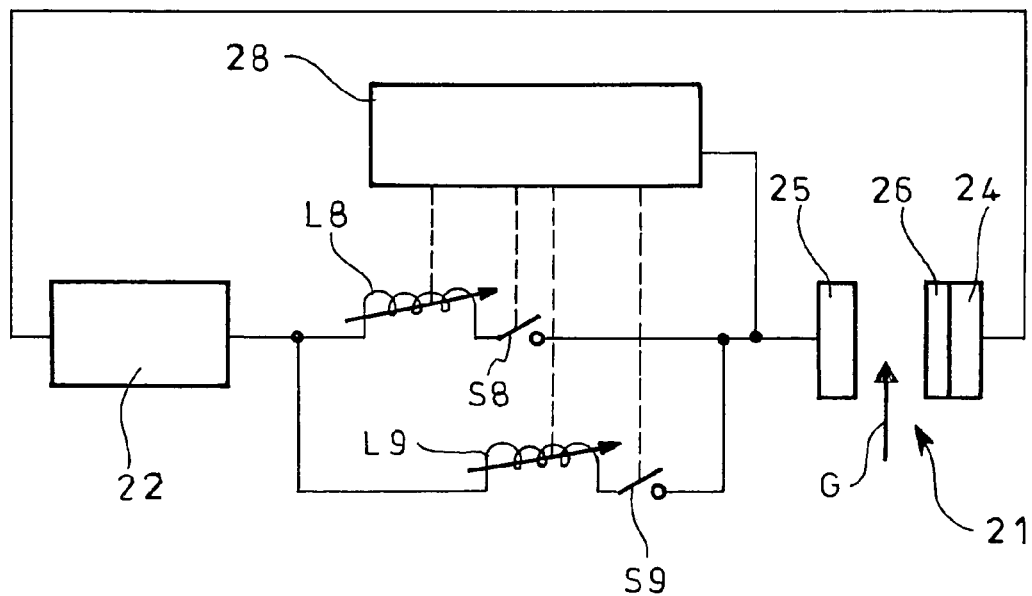
FIG. 8. A conceptual diagram showing a fifth embodiment of an exhaust emission control device according to the invention.
Figure 9:
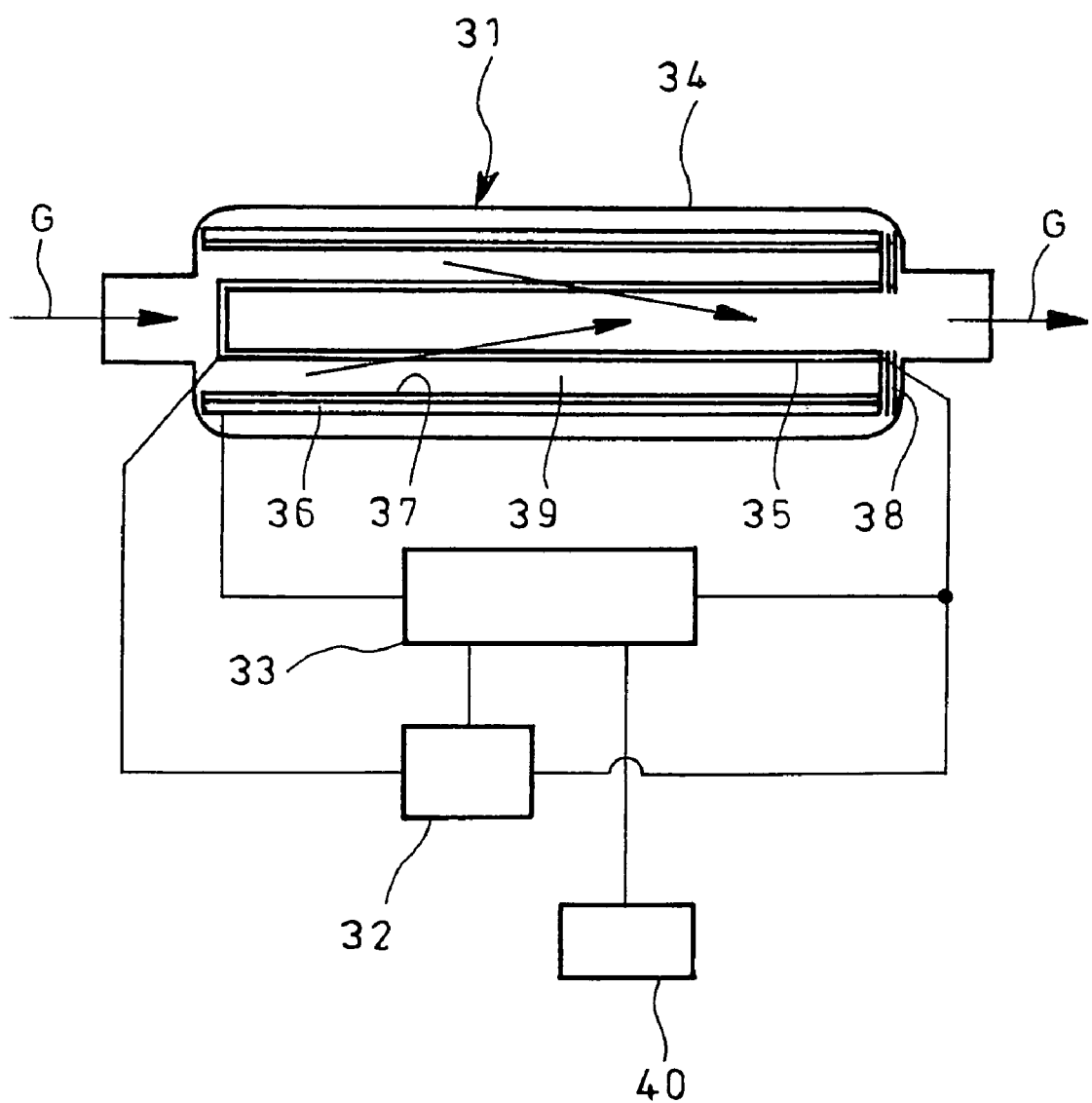
FIG. 9. A conceptual diagram showing a sixth embodiment of an exhaust emission control device according to the invention.
Figure 10:
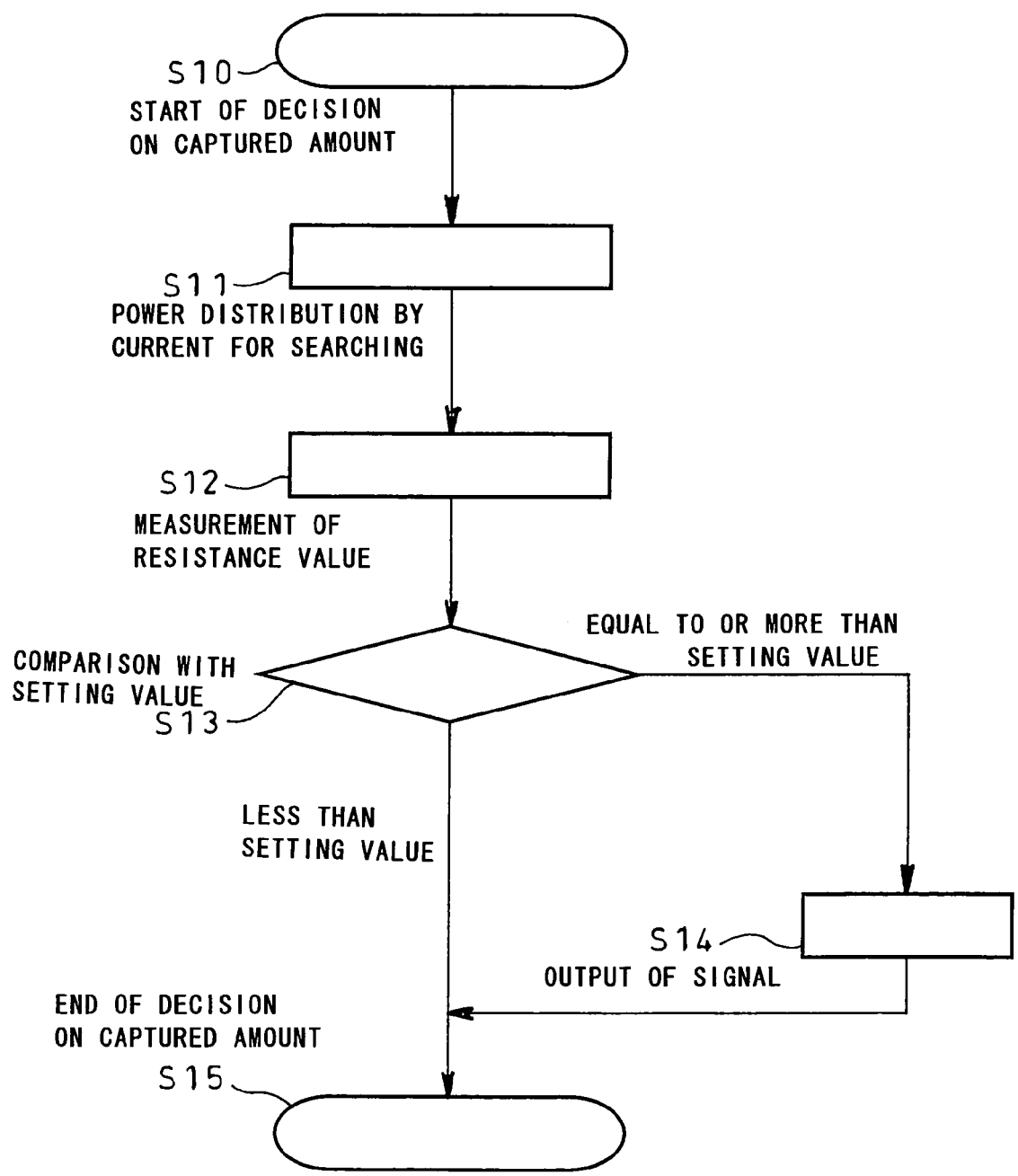
FIG. 10. A flowchart concerning FIG. 9.
Figure 11:
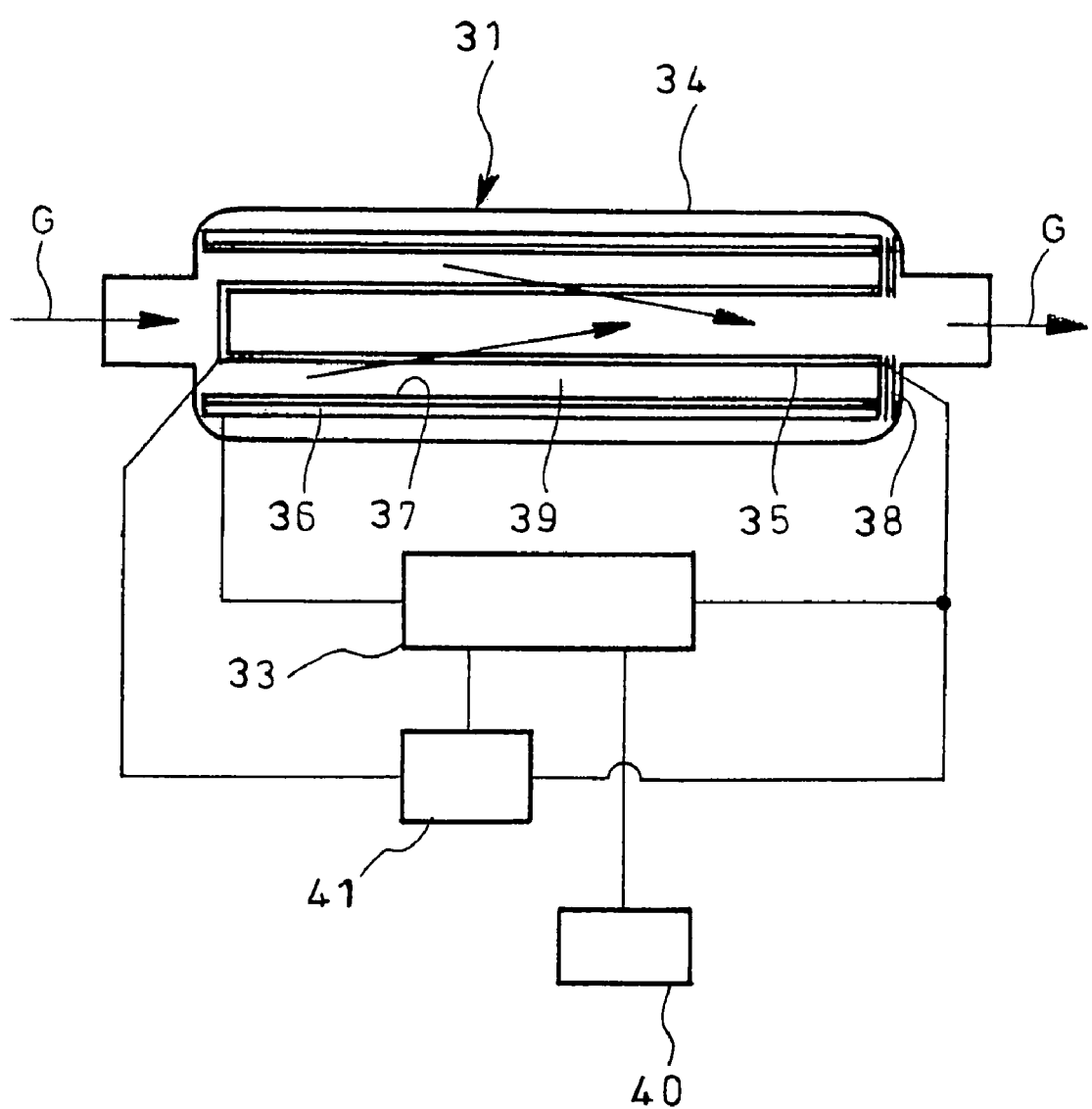
FIG. 11. A conceptual diagram showing a seventh embodiment of an exhaust emission control device according to the invention.
Figure 12:
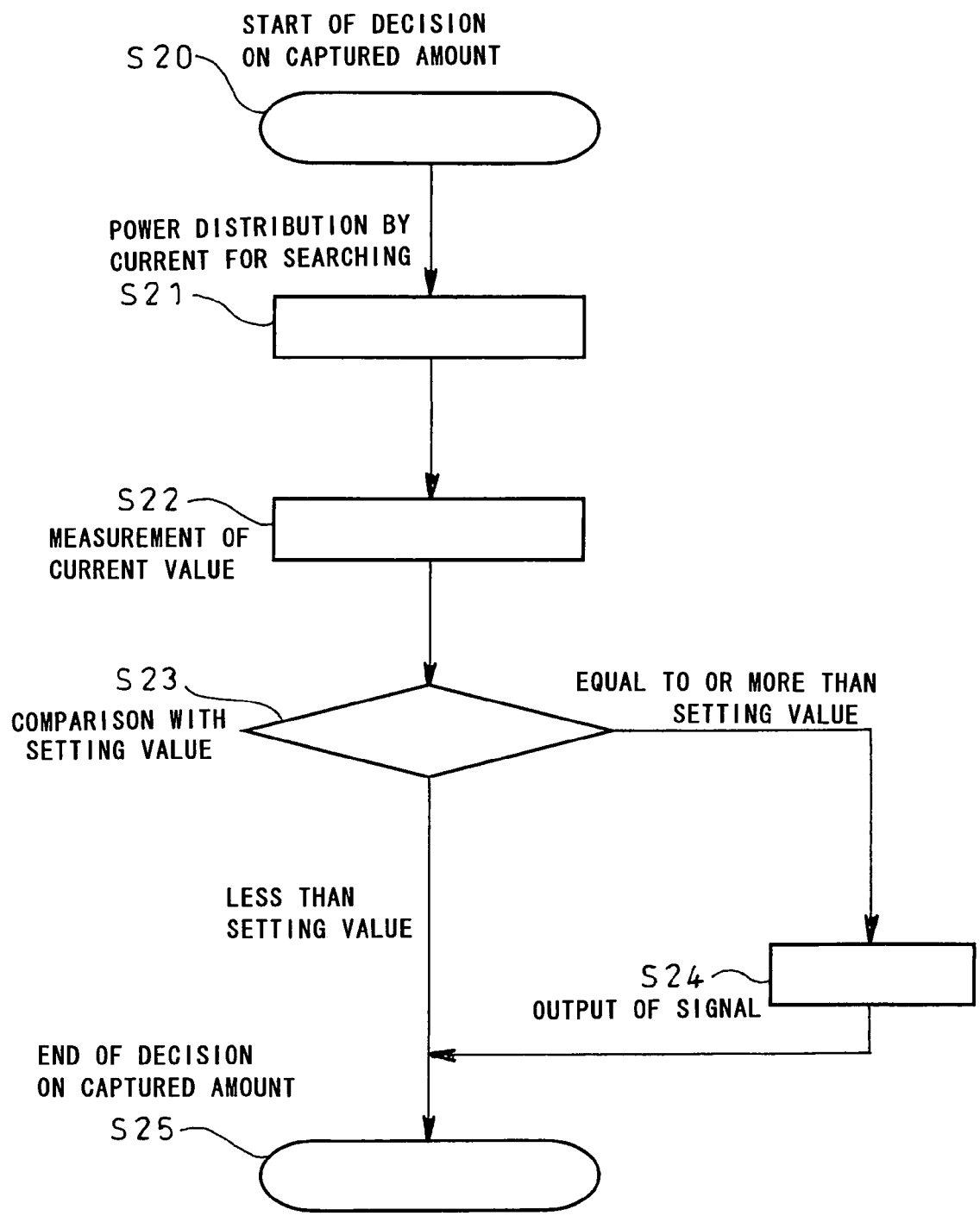
FIG. 12. A flowchart concerning FIG. 11.
Figure 13:
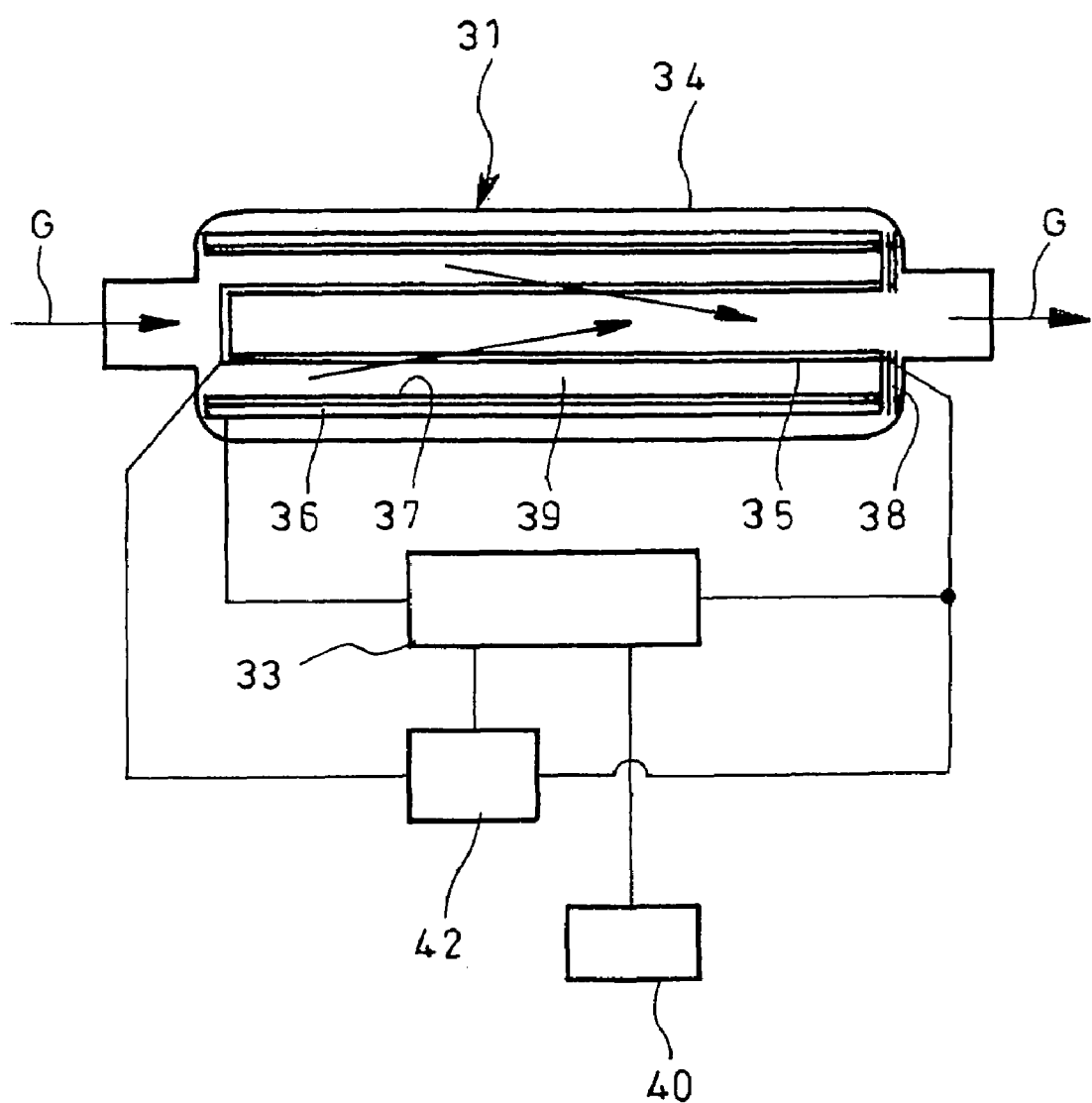
FIG. 13. A conceptual diagram showing an eighth embodiment of an exhaust emission control device according to the invention.
Figure 14:
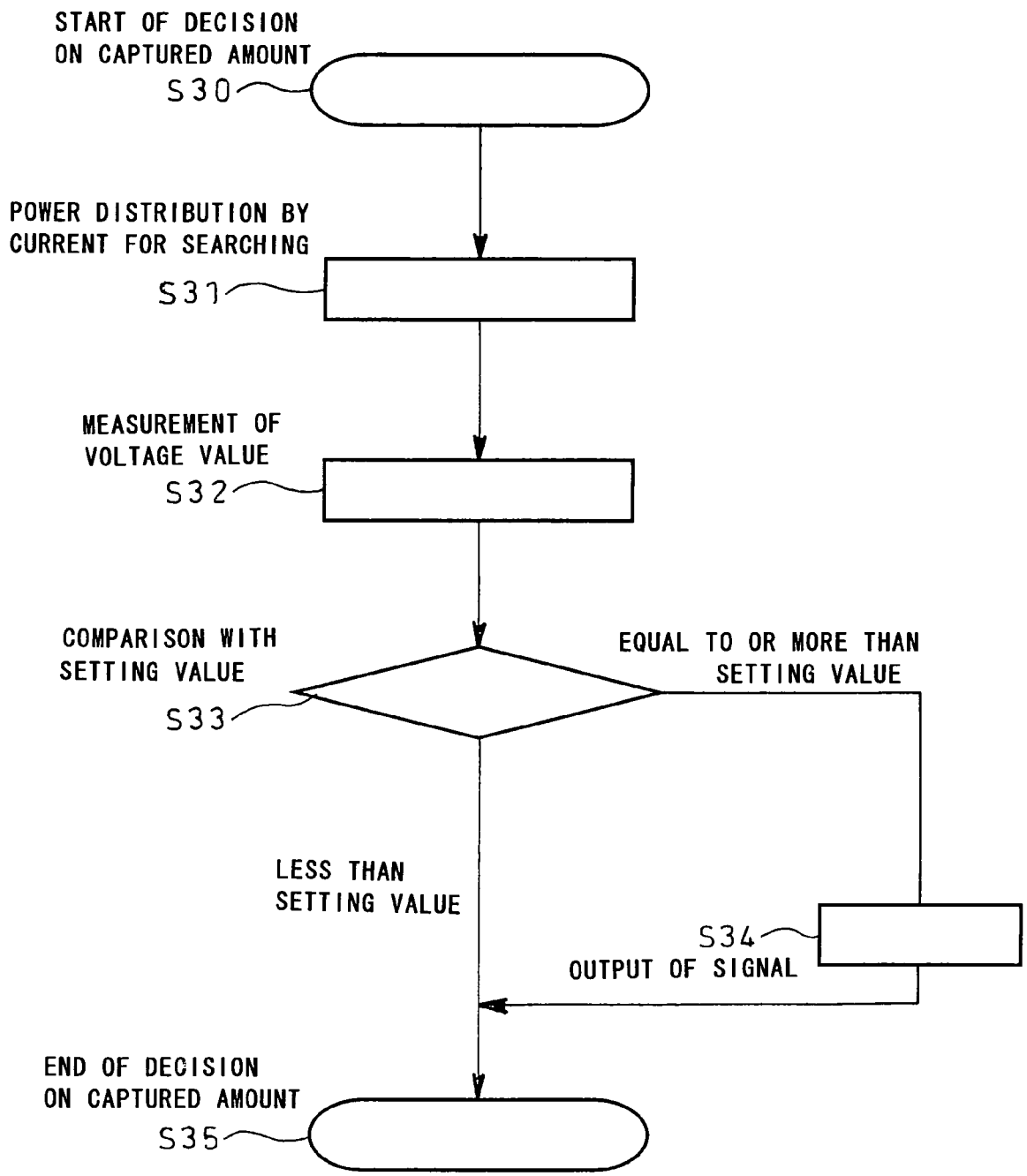
FIG. 14. A flowchart concerning FIG. 13.

EXPLANATION OF THE REFERENCE NUMERALS 2 temperature sensor
3 discharge controller
5 inner electrode (capturing body)
6 outer electrode
11 captured amount deciding means
12 discharge controller
21 capturing cell
22 high voltage output means
23, 27 and 28 inductance control means
24 and 25 electrode
32 captured amount deciding means
33 discharge controller
35 inner electrode (one electrode)
36 outer electrode (the other electrode)
41 and 42 captured amount deciding means
G exhaust
L1-L6 inductor
L7-L9 variable inductor

The invention claimed is:

1. An exhaust emission control device comprising a capturing cell for capturing particulates between a pair of electrodes arranged in a flow passage of exhaust, high voltage output means for distributing AC power for electric discharge to the electrodes, a plurality of variable inductors parallelly connectable between said high voltage output means and said electrodes and inductance control means for detecting a phase of AC power distributed to the electrodes and for controlling variable inductance through connection of proper one or ones of the variable inductors to the high voltage output means and to the electrodes so as to reduce reactance variation.

* * * * *